(No Model.)
S. H. RAYMOND.
NUT LOCK.
No. 313,623. Patented Mar. 10, 1885.
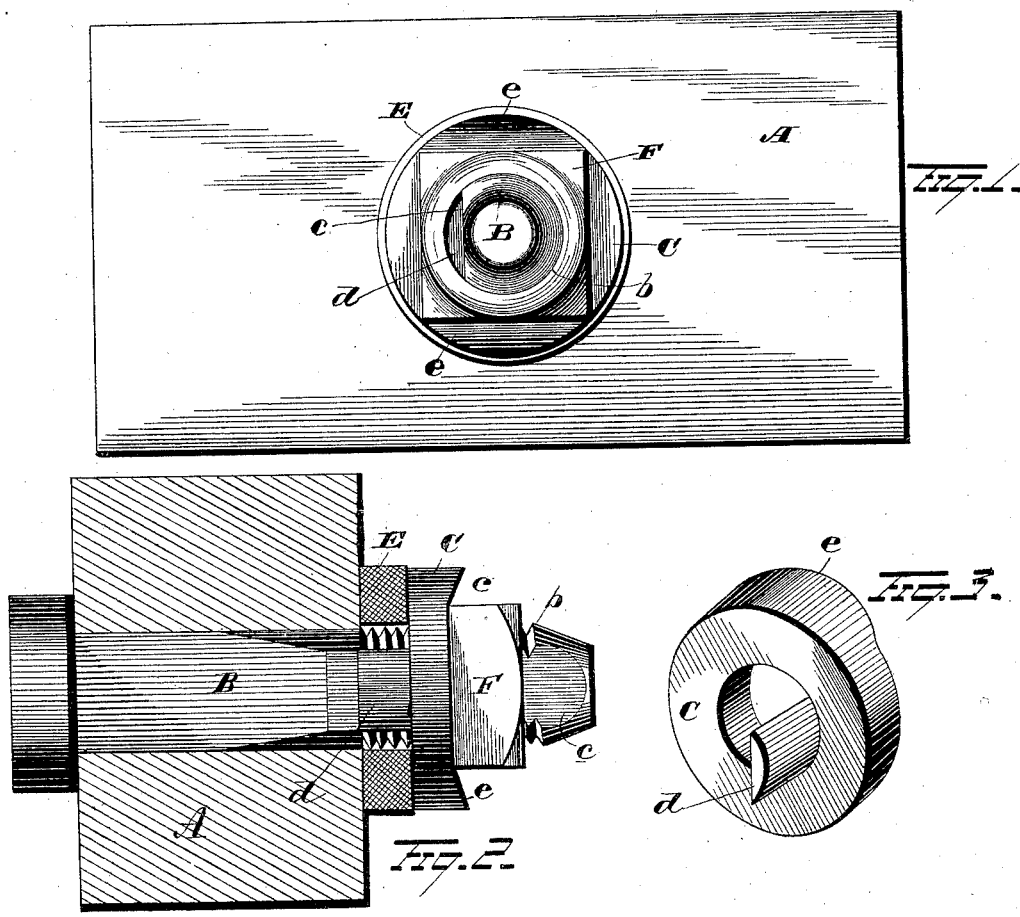
WITNESSES
INVENTOR
Silas H. Raymond.
By H. A. Seymour
ATTORNEY

UNITED STATES PATENT OFFICE.

SILAS H. RAYMOND, OF GRAND RAPIDS, MICHIGAN, ASSIGNOR TO FRANKLIN L. RAYMOND, OF CLEVELAND, OHIO.

NUT-LOCK.

SPECIFICATION forming part of Letters Patent No. 313,623, dated March 10, 1885.

Application filed May 28, 1884. (No model.)

*To all whom it may concern:*

Be it known that I, SILAS H. RAYMOND, of Grand Rapids, in the county of Kent and State of Michigan, have invented certain new and useful Improvements in Nut-Locks; and I do hereby declare the following to be a full, clear, and exact description of the invention, such as will enable others skilled in the art to which it appertains to make and use the same.

My invention relates to an improvement in nut-locks, the object being to provide a nut-lock of such construction that it shall be certain and effective in its operation, capable of continued use without destroying or impairing any of its parts, and of small first cost in its manufacture.

With these ends in view my invention consists in the parts and combination of parts, as will be more fully described, and pointed out in the claim.

In the accompanying drawings, Figure 1 is a view in elevation of my improved nut-lock. Fig. 2 is a view in side elevation, partly in section, of the same. Fig. 3 is a detached perspective view of the washer.

A represents the piece of material through which the bolt B is inserted. Bolt B is constructed with a solid head, *a*, and a screw-threaded shank, *b*, the latter having a flattened surface, *c*, on one side thereof.

C is a washer, made of malleable or wrought metal. One side of the washer is provided with a lip, *d*, which is made flat on its inner side and engages the flattened surface or bearing *c* on the bolt, the lip serving to give the washer an extended bearing on the bolt and prevent it from turning thereon. The outer surface of the washer is provided with one or more beveled flanges or ribs, *e e*, which are located at the outer edge of the washer, and are inwardly beveled to form cam-surfaces.

E is a rubber washer or collar located between the piece A and the under side of the washer C. An ordinary square or other shaped nut, F, is applied to the outer end of the bolt and screwed thereon. When the nut comes in contact with the outer face of the washer, the square edges on the under side of the nut will engage the beveled flanges or ribs on the washer, which latter will operate as cams and cause the washer to be depressed or forced inwardly against its yielding seat. When the nut has been turned so that its side or sides are disengaged from and are situated parallel to the beveled flanges on the washer, the latter will be forced outwardly, and thus in this position the beveled flanges will form side walls fitting against the sides of the nut, and effectively prevent the accidental displacement of the latter. The nut may be turned down very tightly, and whatever may be the force exerted thereon the yielding washer will serve to prevent the backward rotation of the nut unless considerable force is applied thereto.

The yielding collar or ring E, instead of being made of india-rubber, may consist of a spiral spring or a sheet-metal spring washer.

From the foregoing it will be observed that I am enabled to employ the ordinary nut without change in its shape or construction; also, the ordinary bolt or screw-threaded stud, the only change required consisting in simply flattening one or both sides of the stem of the bolt or stud.

The washer is cheap and simple in its construction, and may be used for a great length of time without impairing its efficiency or value.

Having fully described my invention, what I claim as new, and desire to secure by Letters Patent, is—

A nut-lock consisting of the bolt provided with a flattened side near its screw-threaded end, an elastic washer encircling the bolt, a rigid washer provided on its inner face with a lug, *d*, that engages the flattened side of the bolt and on its outer face with inclined flanges, and a nut engaging the outer face of said washer, the parts being constructed and combined substantially as and for the purpose set forth.

In testimony whereof I have signed this specification in the presence of two subscribing witnesses.

SILAS H. RAYMOND.

Witnesses:
GEORGE COOK,
S. G. NOTTINGHAM.